United States Patent
Peitzer et al.

(10) Patent No.: US 10,637,559 B2
(45) Date of Patent: *Apr. 28, 2020

(54) MAINTAINING ANTENNA CONNECTIVITY BASED ON COMMUNICATED GEOGRAPHIC INFORMATION

(71) Applicant: AT&T Mobility II LLC, Atlanta, GA (US)

(72) Inventors: Haywood S. Peitzer, Randolph, NJ (US); Damir Mustafic, Atlanta, GA (US); James A. Wolters, II, Sandy Springs, GA (US); Matthew Walsh, Roswell, GA (US); Thomas Becker, Atlanta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/146,578

(22) Filed: Sep. 28, 2018

(65) Prior Publication Data

US 2019/0044610 A1 Feb. 7, 2019

Related U.S. Application Data

(63) Continuation of application No. 15/442,527, filed on Feb. 24, 2017, now Pat. No. 10,090,909.

(51) Int. Cl.
*H04B 7/185* (2006.01)
*H04W 48/10* (2009.01)
(Continued)

(52) U.S. Cl.
CPC ......... *H04B 7/18506* (2013.01); *H04B 17/12* (2015.01); *H04B 17/318* (2015.01); *H04W 48/10* (2013.01); *H04W 64/006* (2013.01)

(58) Field of Classification Search
CPC .... H04B 7/18506; H04B 17/12; H04W 48/10
See application file for complete search history.

(56) References Cited

U.S. PATENT DOCUMENTS

| 7,228,227 B2 | 6/2007 | Speer |
| 8,417,444 B2 | 4/2013 | Smid et al. |

(Continued)

FOREIGN PATENT DOCUMENTS

| KR | 20160082213 | 7/2016 |
| WO | WO 2015/082597 | 6/2015 |

(Continued)

OTHER PUBLICATIONS

Hayat et al., "Survey on Unmanned Aerial Vehicle Networks for Civil Applications: A Communications Viewpoint", IEEE, Jan. 2016, 38 pages.

(Continued)

*Primary Examiner* — Nguyen T Vo
(74) *Attorney, Agent, or Firm* — Haynes and Boone, LLP

(57) ABSTRACT

Example methods, apparatus, systems, and articles of manufacture (e.g., physical storage media) to facilitate maintaining of antenna connectivity based on communicated geographic information are disclosed. An example method may include receiving, by a device, position information from a base station. The position information may include an altitude associated with the base station. The method may further include determining a positional difference between the device and the base station based at least on the position information. The method may further include configuring an antenna of the device based at least on the positional difference.

17 Claims, 5 Drawing Sheets

(51) Int. Cl.
*H04B 17/12* (2015.01)
*H04B 17/318* (2015.01)
*H04W 64/00* (2009.01)

(56) References Cited

U.S. PATENT DOCUMENTS

| | | | |
|---|---|---|---|
| 9,087,451 | B1 | 7/2015 | Jarrell |
| 9,116,236 | B1 | 8/2015 | Billsberry et al. |
| 9,311,820 | B2 | 4/2016 | Batla et al. |
| 9,359,074 | B2 | 6/2016 | Ganesh et al. |
| 9,384,668 | B2 | 7/2016 | Raptopoulos et al. |
| 9,387,928 | B1 | 7/2016 | Gentry et al. |
| 9,405,296 | B2 | 8/2016 | Levien et al. |
| 9,407,000 | B1 | 8/2016 | Willistein |
| 9,412,279 | B2 | 8/2016 | Kantor et al. |
| 9,454,157 | B1 | 9/2016 | Hafeez et al. |
| 9,456,361 | B1 | 9/2016 | Levy et al. |
| 9,466,218 | B2 | 10/2016 | Jarrell |
| 9,467,922 | B1 | 10/2016 | Buchmueller et al. |
| 9,489,852 | B1 | 11/2016 | Chambers et al. |
| 10,090,909 | B2 * | 10/2018 | Peitzer ............... H04B 7/18506 |
| 2004/0053634 | A1 | 3/2004 | Gainey et al. |
| 2008/0242297 | A1 | 10/2008 | Lee et al. |
| 2012/0235863 | A1 | 9/2012 | Erdos et al. |
| 2014/0018979 | A1 | 1/2014 | Goossen et al. |
| 2014/0301372 | A1 | 10/2014 | Fukuta |
| 2015/0085799 | A1 | 3/2015 | Laughton |
| 2016/0027314 | A1 | 1/2016 | Stathis |
| 2016/0070261 | A1 | 3/2016 | Heilman et al. |
| 2016/0088498 | A1 | 3/2016 | Sharawi |
| 2016/0134358 | A1 | 5/2016 | Jalali et al. |
| 2016/0202695 | A1 | 7/2016 | Deroos et al. |
| 2016/0232792 | A1 | 8/2016 | van Cruyningen |
| 2016/0253907 | A1 | 9/2016 | Taveira |
| 2016/0266579 | A1 | 9/2016 | Chen et al. |
| 2016/0269917 | A1 | 9/2016 | Hillegas, Jr. et al. |
| 2016/0275801 | A1 | 9/2016 | Kopardekar |
| 2016/0300495 | A1 | 10/2016 | Kantor et al. |
| 2016/0328980 | A1 | 11/2016 | Sharma et al. |
| 2016/0330771 | A1 | 11/2016 | Tan |
| 2016/0342934 | A1 | 11/2016 | Michalik |
| 2017/0150373 | A1 | 5/2017 | Brennan et al. |
| 2017/0190260 | A1 | 7/2017 | Wang et al. |
| 2017/0213443 | A1 | 7/2017 | Hirayama |
| 2017/0287341 | A1 | 10/2017 | Jarrell |

FOREIGN PATENT DOCUMENTS

| | | |
|---|---|---|
| WO | WO 2016/053196 | 4/2016 |
| WO | WO 2016/125161 | 8/2016 |
| WO | WO 2016/132295 | 8/2016 |
| WO | WO 2016/137982 | 9/2016 |
| WO | WO 2016/141748 | 9/2016 |

OTHER PUBLICATIONS

Frew et al., "Airborne communication networks for small unmanned aircraft systems", IEEE, Dec. 2008, 23 pages, [online] [Retrieved on Nov. 30, 2016] <URL: http://ieeexplore.ieee.org/ieee_pilot/articles/96jproc12/jprocEFrew2006127/article.html>.

Degrasse, Martha, "Amazon sees cell towers as drone charging stations", RCR Wireless News, Jul. 25, 2016, 5 pages, [online] [Retrieved on Nov. 30, 2016] <URL: http://www.rcrwireless.com/20160725/networkinfrastructure/dronechargingoncelltowerstag4>.

NASA, "First Steps Toward Drone Traffic Management", National Aeronautics and Space Administration, Nov. 19, 2015, 59 pages.

Gharibi et al., "Internet of Drones", IEEE, Feb. 2, 2016, 15 pages.

Qualcomm, "Leading the world to 5G: Evolving cellular technologies for safer drone operation", Qualcomm, Sep. 2016, 31 pages.

\* cited by examiner

MAINTAINING ANTENNA CONNECTIVITY BASED ON COMMUNICATED GEOGRAPHIC INFORMATION

CROSS-REFERENCE TO RELATED APPLICATIONS

The present application is a continuation of U.S. patent application Ser. No. 15/442,527 filed Feb. 24, 2017and entitled "Maintaining Antenna Connectivity Based on Communicated Geographic Information," which is hereby incorporated by reference in its entirety.

FIELD OF THE DISCLOSURE

This disclosure relates generally to wireless communications and, more particularly, to facilitating maintaining of antenna connectivity based on communicated geographic information.

BACKGROUND

Unmanned aerial vehicles (UAVs), also referred to as unmanned aerial systems (UASs) or drones, may be mobile platforms capable of acquiring (e.g., sensing) information, delivering goods, handling objects, and/or performing other actions, in many operating scenarios/applications. UAVs may be utilized to travel to remote locations that are inaccessible to manned vehicles, locations that are dangerous to humans, and/or any other locations more suited for unmanned vehicles than manned vehicles. Upon reaching such locations, drones can perform many actions, such as acquiring sensor data (e.g., audio, image, video, and/or other sensor data) at a target location, delivering goods (e.g., packages, medical supplies, food supplies, engineering materials, etc.) to the target location, handling objects (e.g., retrieving objects, operating equipment, repairing equipment, etc.) at the target location, and so forth. In the various operating scenarios/applications, the actions performed by the UAVs may require maintaining network connectivity, such as connectivity to a cellular network. However, connectivity may be affected by altitude (e.g., how high the UAV is located), which can reduce performance of the UAV.

SUMMARY

Using various embodiments, antenna connectivity of devices can be maintained based on geographic information communicated to the devices by access points of a network, such as communicated by base stations of a cellular network. In some cases, the geographic information may be provided in broadcast messages received by the devices, such as master information block messages and system information block messages. The geographic information may include position information, obstacle information, weather information, traffic management information, emergency/critical broadcast information, a pointer to a data channel that can provide additional and/or more detailed information, and/or generally any other static and dynamic information associated with the base stations.

The devices may be UAVs or any devices operated or to be operated at flight altitude. In this regard, the geographic information may include a three-dimensional position, including the altitude, of the base stations to facilitate connectivity of such aerial-based devices at flight altitudes, such as through use of directional antennas. In addition, the geographic information transmitted by a base station may include one or more neighbor lists that reference neighboring base stations of the base station. In some cases, the neighbor lists may include position information for each of the referenced neighboring base stations. The neighbor lists may be utilized by the devices to configure their antennas to point at the base station or at one of the neighboring base stations, such as based on relative signal strengths of signals from the different base stations and/or geographic information (e.g., relative positions, obstacles, weather, etc.).

Using the geographic information, the devices can autonomously configure their antennas so as to receive better reception from the base stations at flight altitudes and throughout their flight paths. With better reception, power dissipation of the devices may also be reduced, allowing the devices to travel a longer duration/distance before needing to be recharged.

In one or more embodiments, a method to facilitate network connectivity for a device includes receiving, by the device, position information from a base station. The position information includes an altitude associated with the base station. The method further includes determining a positional difference between the device and the base station based at least on the position information. The method further includes configuring an antenna of the device based at least on the positional difference.

In one or more embodiments, a device includes an antenna. The device further includes one or more processors. The device further includes a non-transitory machine readable medium comprising instructions stored therein, which when executed by the one or more processors, cause the one or more processors to perform operations including receiving, by the device, geographic information associated with a base station as part of one or more broadcast massages. The geographic information includes position information, obstacle information, and/or emergency broadcast information. The operations further include determining a positional difference between the device and the base station based at least on the geographic information. The operations further include configuring the antenna based at least on the positional difference.

In one or more embodiments, a tangible machine readable storage medium including machine readable instructions which, when executed, cause one or more processors of a device to perform operations including receiving, from a base station by the device, position information and an indication of a data channel. The position information includes an altitude associated with the base station. The operations further include determining a positional difference between the device and the base station based at least on the position information and the indication. The position information further includes configuring an antenna of the device based at least on the positional difference.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
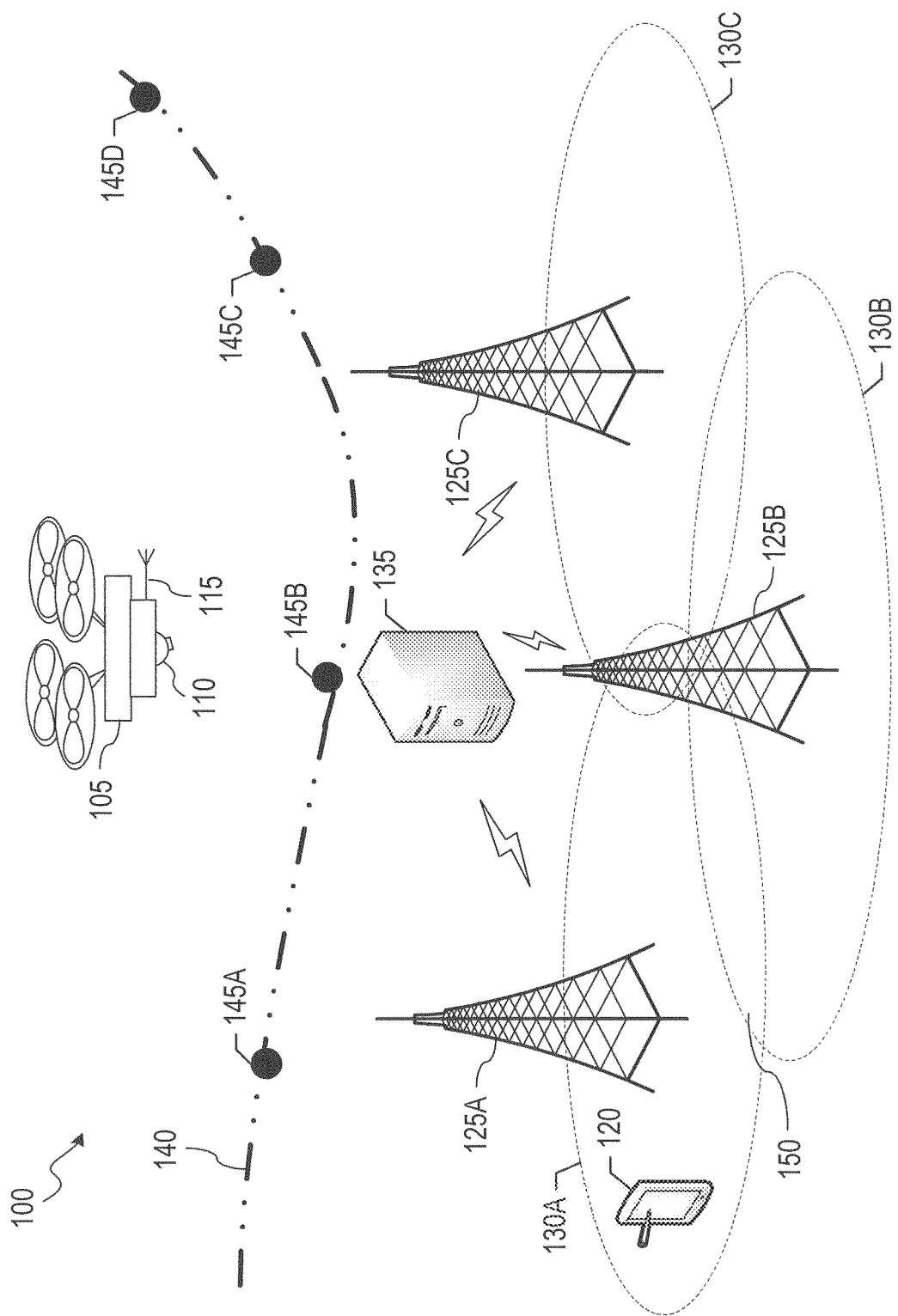
FIG. 1 illustrates an example of a network environment in which a system for facilitating maintaining of antenna

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims Various techniques are provided for facilitating maintaining of antenna connectivity based on communicated geographic information. Geographic information may also be referred to as geographic parameters. In some embodiments, the geographic information may be provided by a network to facilitate directing of directional antennas of user equipment (UEs) toward access points of the network. In this regard, pointing the directional antennas at the access points may allow for better reception of signals (e.g., packets) communicated between the UEs and the access points. By way of non-limiting example, the geographic information may include information, such as position information, obstacle information, weather information, traffic management information (e.g., air traffic management information), emergency/critical broadcast information, and/or generally any other static and dynamic information associated with the access points.

The geographic information may include position information in a three-dimensional (3D) space. For example, an access point of the network may transmit position information that includes a longitude coordinate, a latitude coordinate, and an altitude coordinate associated with the access point. The altitude coordinate may be a distance (e.g., height) from a reference sea level. In some cases, rather than the longitude, latitude, and/or altitude coordinates, other coordinate systems by which to define the position of a device (e.g., access point, UE) may be utilized. A UE may determine a direction in which to point its antenna (e.g., directional antenna) based on a positional difference between the UE and the access point of the network. In an aspect, the UE may be an aerial vehicle/device, which may refer to any vehicle or device that is operated or to be operated at flight altitude.

The network may include a wide area network (WAN), such as a cellular-based WAN. In the case of a cellular network, the geographic information may be provided by base stations of the cellular network to the UEs. In an aspect, the geographic information may be provided as part a broadcast message. For example, the geographic information may be included in a master information block (MIB) message, system information block (SIB) message, Multimedia Broadcast Multicast Services (MBMS)-based message, Evolved MBMS (eMBMS)-based message, and/or generally any message that can be transmitted (e.g., broadcasted) by the base stations of the cellular network and received by UEs that are within receiving range of the messages.

In some aspects, base stations of a cellular network are generally those base stations utilized with UEs at ground level or near ground level, such as vehicles (e.g., cars) and mobile phones operated at or near ground level. For example, position and orientation (e.g., tilt) of antennas of the base stations may be configured to provide higher signal strength for devices below these antennas. In this regard, the base stations may be designed with a main antenna pattern that primarily encompasses a ground region. Furthermore, at lower altitudes, obstructions such as buildings and trees may help prevent signals from multiple base stations from reaching the vehicles and devices at or near ground level with signal strengths that cause significant interference.

When radio modules, such as 3G, 4G, 4G Long Term Evolution (LTE), 5G, other $3^{rd}$ Generation Partnership Project (3GPP)-based radio modules, and/or other radio modules, are placed at flight altitude, such as 400 feet or 500 feet, the line of sight propagation of signals from multiple base stations may be received by the radio modules and cause interference. The different antenna patterns (e.g., different vertical antenna patterns) of the base stations at different radio frequencies (e.g., in different frequency bands) and/or at different altitudes may cause degradation of communicated signals, including signals associated with application data and command/control functions. In addition, higher altitudes generally have fewer obstructions than at ground level, and thus more signals may reach the devices/vehicles at higher altitudes and cause interference relative to devices/vehicles at ground level. The aerial devices/vehicles may include directional antennas to point in a direction of a desired base station, such as a closest base station and/or a base station associated with highest signal strength. However, pointing the directional antennas may be difficult without knowledge of the position of the various base stations.

In an embodiment, the aerial devices/vehicles may use the geographic information from the base stations to point their directional antennas at the base stations. Accordingly, in an embodiment, the 3D position information and/or other geographic information provided by the base stations may facilitate communication with the network by aerial devices/vehicles, such as UAVs. For example, the geographic information may be provided by the base stations to the UAVs to allow the UAVs to point directional antennas so as to receive better reception (e.g., higher signal strength) at flight altitudes.

Thus, in some aspects, although the aerial devices/vehicles are not communicating with base stations dedicated to aerial communication, the base stations may be configured to (e.g., programmed to) provide the geographic information to accommodate (e.g., communicate with) the aerial devices/vehicles without disrupting service to UEs at ground level. In an aspect, the base stations may accommodate cellular communication with the aerial devices/vehicles with minimal or no changes to structural features, such as the housing, antennas, and/or other components, such that the use of the base stations with the UEs at ground level are not affected by the accommodation of aerial devices/vehicles. The 3D position information, and/or other geographic information that may be useful for aerial devices/vehicles, may be utilized by the UEs at ground level when the geographic information is useful to the UEs, processed and disregarded by the UEs, or ignored by the UEs (e.g., the UEs do not scan for messages that contain such geographic information).

In one or more embodiments, the subject technology facilitates the maintaining of cellular connectivity and safe navigation of the aerial devices/vehicles beyond line of sight of an operator. For example, UAVs may encounter obstacles (e.g., high-rises, trees) and/or weather (e.g., rain) that may impede flight. Although the UAVs may utilize information from sensors (e.g., onboard sensors) to detect such obstacles, the sensors may be adversely affected by fog, rain, lighting (e.g., sun, darkness), interference, and/or component failure. To complement or replace the onboard sensors, the geographic information from the base stations may serve as a lighthouse/beacon that can provide information pertaining to obstacles (e.g., towers, bridges, tall buildings) and weather (e.g., freezing, rain, fog) around the base stations. The maintained cellular connectivity may help ensure that the geographic information may be reliably received by the UAVs.

Furthermore, with better reception facilitated by the use of directional antennas, power dissipation associated with transmitting packets to and/or receiving packets from the base stations may be reduced. The lower power dissipation may increase the duration/distance UAVs can travel before needing to be recharged. In this regard, the UAVs may reach a destination point faster with fewer or no intermediary stops (e.g., at UAV power docking stations). In terms of infrastructure, the lower power dissipation of individual UAVs may allow for a less dense distribution of UAV power docking stations.

Although the description of the present disclosure is made with respect to UAVs and cellular networks, the techniques described herein may be applied to any wireless networks and any devices/vehicles capable of establishing connectivity in such wireless networks. By way of non-limiting example, the devices/vehicles may include, or may be included in, devices or vehicles at or near ground level (e.g., mobile devices, cars), naval-based devices (e.g., watercraft), and devices at higher altitudes (e.g., UAVs, any device at higher altitudes)). In this regard, the techniques described herein may be utilized for devices located at higher altitudes, such as mobile phones, vending machines, set-top boxes, and/or other devices/vehicles operated at higher floors of a building.

FIG. 1 illustrates an example network environment 100 in which a system for facilitating maintaining of antenna connectivity based on communicated geographic information may be implemented in accordance with one or more embodiments. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 1.

In an embodiment, the network environment 100 is implemented to form part of a cellular network, such as a 3G, 4G, 5G, and/or other 3GPP-based cellular network, and/or a cellular network based on other cellular standards. In this regard, as an example, the description of FIG. 1 is made herein with respect to the network environment 100 providing a cellular network. However, in some examples, the network environment 100 may be additionally or alternatively implemented to form part of a satellite communication network, microwave radio network, and/or other wireless networks.

The network environment 100 includes a UAV 105, a user device 120, base stations 125A-C, and a network management system 135. The UAV 105, user device 120, base stations 125A-C, and network management system 135 may be in communication directly or indirectly. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events.

The UAV 105 may include, may be a component of, and/or may be referred to as, a UE. The UAV 105 may include a flight control unit, communication unit, and payload unit. The flight control unit may be configured to facilitate navigation of the UAV 105, e.g., take off, landing, and flight of the UAV 105. The flight control unit may include any appropriate avionics, control actuators, and/or other equipment, along with associated logic, circuitry, interfaces, memory, and/or code.

The communication unit may include one or more radio transceivers (e.g., antennas) along with associated logic, circuitry, interfaces, memory, and/or code that enable communications, e.g. with the user device 120, one or more of the base stations 125A-C, and/or the network management system 135, via wireless interfaces and using the radio transceivers. In FIG. 1, the radio transceivers of the UAV 105 include an omnidirectional antenna 110 and a directional antenna 115. The omnidirectional antenna 110 may be utilized to radiate and/or receive power uniformly in all directions. The directional antenna 115 may be utilized to radiate and/or receive power from a desired direction to allow increased performance (e.g., higher signal strength) in the desired direction, such as through higher gain and directivity and reduced interference due to signals from sources deviating from the desired direction. In this regard, signal strength of command/control links and/or application data channels may be improved, and/or interference of signals from different base stations may be reduced. The omnidirectional antenna 110 and/or directional antenna 115 may be contained within a housing of the UAV 105, or disposed (e.g., mounted) outside a housing of the UAV 105. In some cases, the omnidirectional antenna 110 and/or directional antenna 115 may be movable along and/or rotatable about one, two, or three axes. In other cases, the omnidirectional antenna 110 and/or directional antenna 115 may be fixed (e.g., not movable and not rotatable).

The signal strength may be, or may be based on, measures such as received signal strength indicator (RSSI), reference signal received power (RSRP), reference signal received quality (RSRQ), signal-to-noise ratio (SNR), signal-to-interference-plus-noise ratio (SINR), and/or other measures. Such measures of signal strength may be computed by the UAV 105. In an aspect, signal strength may be referred to as signal quality, signal level, or signal power. A higher signal strength is generally associated with better reception.

In some cases, the communication unit may include suitable logic, circuitry, interfaces, memory, and/or code that enable wired communications, e.g. with the user device 120, one or more of the base stations 125A-C, and/or the network management system 135. In this regard, the UAV 105 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. A wired link may be implemented with a power-line cable, coaxial cable, fiberoptic cable, or other cable or wires that support corresponding wired network technologies. For example, the UAV 105 may utilize wired connections when at or near ground level, such as a wired connection between the UAV 105 and user device 120 for facilitating testing and/or calibration/setup of the UAV 105.

The payload unit may be configured to implement features supported by the UAV 105 and facilitate implementation of such features. The payload unit may include any equipment and associated logic, circuitry, interfaces, memory, and/or code. The payload unit may include a global positioning system (GPS) that provides a current position of the UAV 105 (e.g., using three coordinates). The position information from the GPS, together with position information of devices in communication with the UAV 105, may allow the UAV 105 to direct the directional antenna 115 to, or to a vicinity of, one or more of these devices. By facilitating establishing and maintaining of connections with higher signal strength, the UAV 105 may facilitate implementation of various features supported by the UAV 105.

Depending on an application(s) of the UAV 105, the payload unit may include one or more onboard sensors, which may be contained within a housing of the UAV 105 or mounted outside the housing of the UAV 105. By way of non-limiting example, sensors may include environmental sensors, such as temperature sensors, rain sensors, pressure sensors, humidity sensors, fog sensors, gas sensors, etc., or combination thereof; object/obstacle detection sensors, such as radar sensors, proximity sensors, motion detectors, etc., or combination thereof; imaging sensors (e.g., cameras); acoustic sensors, and/or other types of sensors, or combination thereof. Alternatively or in addition, the payload unit may include tools, actuators, robotic manipulators, etc., capable of performing an action, such as touching, grasping, delivering, and/or measuring objects. For delivery applications, the payload unit may include the object to be delivered, e.g. the object may be secured within a housing of the UAV 105.

The user device 120 may be, and/or may include, a mobile phone, a personal digital assistant (PDA), a tablet device, a computer, or generally any device that is operable to communicate wirelessly (e.g., via cellular standards using antennas) with the UAV 105, one or more of the base stations 125A-C, and/or the network management system 135. In an aspect, the user device 120 may be a remote control used by an operator (e.g., a human) to provide commands to the UAV 105 when the UAV 105 is within line of sight of the user device 120. For example, the operator may issue commands via the user device 120 to instruct the UAV 105 to fly in certain directions and/or at certain speeds and/or to perform activities such as picking up or delivering an object. In an aspect, the line of sight of the user device 120 may refer to a coverage area or coverage volume within which signals transmitted by the user device 120 to the UAV 105 can be received by the UAV 105 with sufficient signal strength. In some cases, the sufficient signal strength may be a preset threshold level (e.g., SNR level), which may be set during a setup/calibration stage for associating the UAV 105 with the user device 120.

In an embodiment, the UAV 105 and the user device 120 may wirelessly communicate with each other using wireless standards, such as the Institute of Electrical and Electronics Engineers (IEEE) 802.11 standard, Bluetooth® standard, ZigBee® standard, and/or other wireless standards; cellular standards, such as 3G, 4G, 4G LTE, 5G, and/or other cellular standards; infrared-based communication; optical-based communications; and/or other appropriate communication standards and/or protocols. In some cases, the UAV 105 and the user device 120 may be configured to communicate with each other using a proprietary wireless communication protocol and interface.

In some cases, the UAV 105 and the user device 120 may be configured to interface with a wired network, such as via an Ethernet interface, power-line modem, DSL modem, PSTN modem, cable modem, and/or other appropriate components for wired communication. Alternatively or in addition, the UAV 105 user device 120 may support proprietary wired communication protocols and interfaces. The UAV 105 and the user device 120 may be configured to communicate over a wired link (e.g., through a network router, switch, hub, or other network device) for purposes of wired communication, e.g. such as during testing, setup, and/or calibration stages between the UAV 105 and the user device 120. The UAV 105 may be at or near ground level to receive a wired connection.

Although a single user device (e.g., the user device 120) is shown in FIG. 1, multiple user devices (e.g., multiple devices owned by or otherwise accessible to the same operator) may be utilized to communicate with the UAV 105. For example, the same operator may communicate with the UAV 105 using the user device 120 (e.g., a tablet device) and/or a mobile phone.

One or more of the base stations 125A-C may include, may be a component of, and/or may be referred to as, a cell, a Node B (NB), an Evolved Node B (eNodeB or eNB), or a Home eNB (HeNB). One or more of the base stations 125A-C include suitable logic, circuitry, interfaces, memory, and/or code that enable communications, e.g. with the user device 120, one of the other base stations 125A-C, and/or the network management system 135, via wireless interfaces and utilizing one or more radio transceivers (e.g., antennas).

In an aspect, the base stations 125A-C may transmit (e.g., broadcast) messages that, if received by the UAV 105, facilitate directing of the directional antenna 115 of the UAV 105 and/or navigation of the UAV 105. In some cases, the messages transmitted by the base stations 125A-C may be based on information the base stations 125A-C receive from the network management system 135. In some cases, one or more of the base stations 125A-C may be mobile (e.g., mobile base stations at ground level, mobile base stations at flight altitudes, mobile naval-based base stations, etc.), in which case its position information is dynamic.

The base stations 125A-C may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters. In FIG. 1, the base stations 125A, 125B, and 125C have nominal coverage area 130A, 130B, and 130C, respectively, at ground level or near ground level. The coverage area of a base station may be different in different environments, at different altitudes, and at different frequency bands. For example, a base station may have a smaller coverage area on a rainy day than the same base station on a sunny day, e.g. due to attenuation of signals by rain. When altitudes are taken into consideration, the coverage area provided by the base stations 125A-C may more appropriately be referred to as a coverage volume, with different coverage areas at different altitudes. In an aspect, a coverage area of a base station may be larger at flight altitudes (e.g., 400 feet) than at lower altitudes such as ground level, due to fewer obstructions at flight altitudes for example. As used herein, the coverage area and coverage volume may be referred to more generally as a coverage region, where the region may be two-dimensional (e.g., coverage area) or three-dimensional (e.g., coverage volume).

The network management system 135 may be, may include, and/or may be a component of, a core network for processing information from UAVs (e.g., the UAV 105), user devices (e.g., the user device 120), and/or base stations (e.g., the base stations 125A-C) and managing connections of the UAVs and/or user devices to the base stations. For example, the network management system 135 may be, may include, and/or may be in communication with, a mobile telephone switching office (MTSO). The network management system 135 and the base stations 125A-C may be provided by a mobile network operator. The network management system 135 includes suitable logic, circuitry, interfaces, memory, and/or code that enable communications, e.g. with one or more of the base stations 125A-C and/or one or more UEs (e.g., the UAV 105, the user device 120), via wireless interfaces and utilize one or more radio transceivers. In this regard, the network management system 135 may be dedicated to facilitate connectivity of UAVs (or other vehicles/devices at flight altitude) with the base stations 125A-C (and/or other base stations), or may be utilized to facilitate connectivity of UAVs and ground-based devices with the base stations 125A-C (and/or other base stations).

In an aspect, the network management system 135 may be, may include, or may be a part of, a server (e.g., a centralized server) that can generate and distribute information to the user device 120 and/or base stations 125A-C. The user device 120 and/or the base stations 125A-C may then relay the information from the network management system 135 to the UAV 105. In some cases, when the UAV 105 is in range of the network management system 135, the network management system 135 may transmit information directly to the UAV 105. In an aspect, the network management system 135 may provide each of the base stations 125A-C with respective geographic information (e.g., position, obstacle, weather, emergency broadcast information) to be transmitted (e.g., broadcasted) by the base stations 125A-C. For example, the network management system 135 may be in communication with one or more sources (e.g., sensors, information services) that provide the network management system 135 with obstacle, weather, traffic information, and/or emergency broadcast information. The network management system 135 may then relay the geographic information received from these sources to the base stations 125A-C. In general, at least some of the geographic information is different for each base station.

The base stations 125A-C may be in communication with the network management system 135 through a backhaul network. The network management system 135 may be in direct communication with one or more of the base stations 125A-C or in communication with one or more of the base stations 125A-C through one or more intermediary base stations. For example, in FIG. 1, the network management system 135 is in direct communication with the base stations 125A-C. In other cases, a base station may be in communication with the network management system 135 via one or more intervening base stations.

In some aspects, the base stations 125A-C may individually store or otherwise have access to a neighbor list that includes neighboring relationships of a base station with other base stations. The neighbor list may be an automatic neighbor relation (ANR) table. In some cases, the neighboring relationships may be based on measurement reports from UEs (e.g., the UAV 105). The measurement reports may include signal strengths (e.g., RSSI, RSRP, etc.) of signals from the base stations 125A-C that are received and measured by the UEs.

In some cases, the network management system 135 may generate, store, maintain, and/or update the neighbor list. For example, the neighbor list for the base station 125A may be generated by the network management system 135 based on measurement reports provided by the UEs to the base station 125A and relayed by the base station 125A to the network management system 135. Alternatively or in addition, the network management system 135 may generate the neighbor list based on signal strength statistics, such as RSRP or RSSI variances, average SNR, average SINR, and/or generally any other signal strength statistics computed based on one or more signals received and measured by the UEs. The statistics may be computed by the UEs, the base stations 125A-C, and/or the network management system 135.

If the base station 125A receives comparative signal strengths from the UAV 105 for the base stations 125A and 125B, the base station 125A and/or the network management system 135 may determine that the base stations 125A and 125B can be referenced as neighboring base stations on the neighbor list. In an aspect, multiple neighbor lists may be generated for each base station. For example, one neighbor list for the base station 125A may be generated based on measurement reports from UEs at ground level (or near ground level), whereas a different neighbor list may be generated based on measurement reports from UEs at flight altitudes (e.g., UAVs).

In some cases, the neighbor list may include position information (e.g., longitude, latitude, altitude) of each base station on the neighbor list and/or otherwise provide information indicative of the position information of each base station. For example, the position information may allow the UAV 105 to transition the directional antenna 115 from pointing at the base station 125A to pointing at one of the base stations on the neighbor list for the base station 125A, such as when the UAV 105 is getting farther from the base station 125A and/or closer to a neighboring base station of the base station 125A. In some cases, the neighbor list may include other geographic information (e.g., obstacle information, weather information, etc.) for each base station on the neighbor list.

In an embodiment, the network management system 135 may determine and/or have access to signal strength statistics at different positions (e.g., altitudes) and/or different frequency bands, e.g. based on the measurement reports generated by the UEs. In some cases, the network management system 135 may determine preferred frequency bands to be utilized at various altitudes based on the signal strength statistics. The network management system 135 may provide the signal strength statistics to the base stations 125A-C, e.g. to be relayed to UEs.

In one or more embodiments, to facilitate connectivity between the base stations 125A-C and UAVs (e.g., the UAV 105), the base stations 125A-C may transmit geographic information associated with the base stations 125A-C. As previously indicated, in one or more aspects, the base stations 125A-C may receive at least some of the geographic information from the network management system 135. In some aspects, the geographic information includes position information. The position information may include a longitude, latitude, and altitude of an antenna of the base station, and/or information indicative of the longitude, latitude, and altitude (e.g., information from which the UAV 105 may derive the longitude, latitude, and altitude). In some cases, rather than the longitude, latitude, and/or altitude coordinates, other coordinate systems by which to define the position of the base stations 125A-C may be utilized.

The position information received by the UAV 105 from one or more of the base stations 125A-C may allow the UAV 105 to point the directional antenna 115, such that the main lobe of the antenna receives a certain threshold or level of the signal transmitted from the one or more base stations. For example, when the UAV 105 receives position information of the base station 125A, the UAV 105 may determine a positional difference between the UAV 105 and the base station 125A and configure the directional antenna 115 to point at the base station 125A based on the determined positional difference. The configuring of the directional antenna 115 to point at the base station 125A may allow the directional antenna 115 to better receive (e.g., receive at higher signal strength) signals from the base station 125A, relative to a case in which the omnidirectional antenna 110 is used and/or the directional antenna 115 is randomly pointed. As the UAV 105 moves, the UAV 105 can adjust the directional antenna 115 accordingly to continue to point at the base station 125A, with or without guidance from subsequent geographic information (e.g., position information) received from the base stations 125A-C. In this manner, the UAV 105 may maintain the wireless communication link between the UAV 105 and the base station 125A at an acceptable signal strength during at least a portion of a flight path of the UAV 105. In some cases, the UAV 105 may point at another base station when the signal strength and/or signal strength statistics associated with signals from the base station 125A falls below a threshold value.

The connectivity between the UAV 105 and the cellular network via the base stations 125A-C (and/or other base stations) may be further facilitated through additional geographic information such as obstacle, weather, traffic management information (e.g., air traffic management information), emergency broadcast information, and/or generally any other information that may be static or dynamic in the airspace that can be communicated to facilitate communication of the UAV 105 with the cellular network.

The obstacle information and weather information may identify obstacles (e.g., trees, buildings) and weather (e.g., rain, fog, hail) within coverage regions of the base stations 125A-C, or portion thereof. For example, the base station 125A may provide position information (e.g., latitude, longitude, height) encompassed by the obstacles. The traffic management information may provide information indicative of signal strengths at different frequency bands and/or at different positions (e.g., altitudes, longitudes, and/or latitudes). In some cases, the traffic management information may provide preferred frequency bands at different altitudes. Alternatively or in addition, the traffic management information may identify neighbors associated with the base station 125A. The emergency broadcast information may identify traffic incidences and/or no-fly zones (e.g., temporary no-fly zones due to these traffic incidences).

In an aspect, the neighbor list(s), signal strength statistics, and/or preferred frequency bands and/or preferred altitudes may be part of the geographic information (e.g., part of the traffic management information) transmitted by the base stations 125A-C to the UAV 105. Such information may allow the UAV 105 to select the base station to point to, adjust a frequency band utilized for communication, and/or adjust a flight path (e.g., an altitude of various points along the flight path). For instance, the UAV 105 may be directed (e.g., redirected) along a flight path that traverses through coverage regions with better reception. In some cases, one or both of the flight altitude and frequency band of operation may be selected by the UAV 105 (e.g., rather than fixed).

In some cases, the geographic information from the base station 125A may include an indication (e.g., a pointer) to a data channel (e.g., a streaming data channel) to which the UAVs can tune to receive additional and/or more detailed information (e.g., obstacle, weather, traffic information, emergency broadcast information). The data channel may be a website, broadcast channel, and/or other communication avenues by which to provide additional and/or more detailed information. The indication may be, or may include, a uniform resource locator (URL) associated with a website, a frequency band associated with a broadcast channel (e.g., an LTE broadcast channel), and/or generally any manner by which to indicate/identify a data channel that can provide additional and/or more detailed information. The UAV 105 may access the data channel based on the indication, e.g. the URL and/or frequency band provided as, or as part of, the indication. The website and/or broadcast channel may be provided by the mobile network operator and/or by another party (e.g., a dedicated weather broadcast channel), and may be publically accessible or accessible via subscription.

By facilitating maintaining high signal strength connectivity, the subject technology may further facilitate the operation of UAVs (e.g., the UAV 105) beyond line of sight of an operator(s) of the UAVs. For example, the higher signal strengths that may be effectuated through the use of the directional antenna 115 may help ensure that the UAV 105 can maintain connectivity (or a threshold level of connectivity) throughout its flight path. In some cases, the geographic information from the base stations 125A-C facilitates navigation of the UAV 105 without the UAV 105 being provided (e.g., preloaded with) a map with the positions of the base stations 125A-C. In this regard, the UAV 105 may autonomously configure the directional antenna 115 and navigate based on the geographic information received from one or more of the base stations 125A-C along its flight path. Furthermore, with better reception facilitated by the use of the directional antenna 115, power dissipation of the UAV 105 associated communicating with one or more of the base stations 125A-C may be reduced. In this regard, the UAV 105 may be able to fly for a longer distance/duration before needing to be recharged, and/or may make fewer or no intermediary stops (e.g., at UAV power docking stations) between a starting point and a destination point.

Such additional information may be received and utilized to configure the directional antenna 115 to better point at the base station 125A or to configure the directional antenna 115 to point to another of the base stations. For example, the UAV 105 may transition the directional antenna 115 from pointing at the base station 125A to pointing at one of the base stations on the neighbor list of the base station 125A, such as when signals between the base station 125A and the UAV 105 are about to be obstructed by an obstacle (e.g., identified in the obstacle information transmitted by the base station 125A and/or other base stations).

In an aspect, the position information and/or other geographic information may be accessible to and usable by all UEs within range of the base stations 125A-C. In another aspect, the position information and/or other geographic information transmitted (e.g., broadcasted) by the base stations 125A-C is encrypted and available to authenticated and/or subscribed UEs only. In some cases, some information may be accessible to and usable by any UEs that receive them, while other information may be available (e.g., decodable) by subscribed UEs only. In an aspect, unsubscribed UEs may be allowed access to (e.g., allowed to decode) the position information and/or other geographic information (e.g., for a fee).

With reference to FIG. 1, beyond line of sight control may be provided by the cellular network, e.g. by way of messages transmitted (e.g., broadcasted) by the base stations 125A-C and received by the UAV 105 as the UAV 105 flies along a flight path 140. The flight path 140 may be a portion of a flight path along which the UAV 105 is moving or intends to move in going from a starting point to a destination point. The flight path 140 may be defined by a set of positions, including positions 145A-D shown in FIG. 1, at which the UAV 105 is located, has been located, or is expected to be located. The positions 145A-D may each be associated with a set of three-dimensional coordinates (e.g., longitude, latitude, altitude). For example, in delivery applications, the starting point may be a warehouse at which the UAV 105 is provided with the payload (e.g., a package) to be delivered and the destination point may be, for example, a customer's house, a post office or courier service office, or other destination from which the payload is to be routed to the customer.

At the position 145A, the UAV 105 may be within the line of sight of the user device 120. Within the line of sight, the UAV 105 may receive control signals directly from the user device 120. At the positions 145B-D, the UAV 105 may be beyond the line of sight of the user device 120. Different base stations may provide better signal strength at the different positions 145A-D. For example, among the base stations 125A-C, the base station 125A may be generally associated with the highest signal strength at the position 145A, whereas the base station 125C may be generally associated with highest signal strength at the positions 145C and 145D.

As shown in FIG. 1, the coverage areas 130A-C of the base stations 125A-C may overlap. The coverage areas 130A-C may represent the coverage areas of the base stations 125A-C at ground level. The UAV 105 may be within range of two or more of the base stations 125A-C. For example, the UAV 105 may be within range of the base stations 125A and 125B in an overlap region 150. Based on a specific position of the UAV 105, signal strength between the UAV 105 and the base station 125A may be different from (e.g., stronger than, weaker than) signal strength between the UAV 105 and the base station 125B. In some cases, the overlap in the coverage regions may be more pronounced at flight altitudes than at ground level, such as due to fewer obstructions.

For a specific geographic position, the UAV 105 may determine the desired base station to communicate with based on measurements of relative signal strengths of signals from different base stations. For example, the UAV 105 may select the base station associated with the highest signal strength and point the directional antenna 115 at the selected base station. The base station that is selected may differ at different altitudes and/or at different frequency bands used for communication. In some cases, when the UAV 105 determines that a link status (e.g., a signal strength) falls below a threshold, the UAV 105 may utilize the omnidirectional antenna 110 and/or move around the directional antenna 115 to locate a base station associated with higher signal strength, and then point the directional antenna 115 at the located base station.

In an embodiment, cellular handover may be performed to transition communications of the UAV 105 from a serving base station to another base station. The handover may be performed when one or more conditions are met. For example, the handover may occur when a signal strength of a second base station is at least a threshold amount higher than a signal strength of the current serving base station, when a signal strength of the current serving base station is below a predetermined threshold, and/or when a signal strength of the second base station is above a predetermined threshold and also higher than a signal strength of the current serving base station.

To facilitate handover, the geographic information may be utilized. As an example, the base station 125A may be the serving station for the UAV 105, and the neighbor list of the base station 125A identifies the base stations 125B and 125C as neighboring base stations. In one case, the base station 125A may receive signal measurements (e.g., RSRP values) from the UAV 105. In an aspect, the signal measurements may be, or may be utilized to generate, signal strength statistics, such as RSRP or RSSI variances, average SNR, average SINR, and/or generally any other signal strength statistics computed based on one or more signals received and measured by the UAV 105. When the signal measurements and/or statistics thereof are below a threshold value, the base station 125A may allow handover of the UAV 105 to one of the base stations 125B or 125C. In some cases, the base stations 125A-C may monitor each other's signals, and the base station 125A may select the base station 125B or 125C to hand over the UAV 105 to based on these monitored signals. In another case, alternatively or in addition, based on signal measurements (e.g., by the UAV 105), the UAV 105 may generate and transmit a request for handover. For example, when the signal strength of signals received by the UAV 105 from the base station 125A is reducing over time, the UAV 105 may determine that signals of higher signal strength may be received from other base stations. If the base station 125A allows handover of the UAV 105 to the base station 125C, the base station 125C becomes the serving base station of the UAV 105. In this example, during and/or after the handover, the base station 125A and/or 125C may provide the UAV 105 with the position information for the base station 125C to allow the UAV 105 to point the directional antenna 115 at the base station 125C.

In some cases, the base stations 125A-C and/or network management system 135 may allow/facilitate a handover of the UAV 105 from one of the base stations 125A-C currently serving the UAV 105 to another of the base stations 125A-C even in a case when the serving base station is associated with highest signal strength. For example, although the signal strength between the UAV 105 and the base station 125A is currently highest, the geographic information may indicate that the UAV 105 is expected to encounter an obstruction (e.g., a tall building) that reduces signal strength of communications between the UAV 105 and the base station 125A. In this example, the UAV 105 may be handed over to another base station, e.g. associated with sufficiently high signal strength and no significant obstructions.

In an aspect, the flight path 140 may be a pre-programmed flight path, e.g. provided by the user device 120 and/or network management system 135. For example, the UAV 105 and/or the user device 120 may communicate (e.g., directly or indirectly) with the network management system 135 and provide a starting point (e.g., a current position of the UAV 105) and a destination point. In response, the network management system 135 may generate and provide to the UAV 105 and/or user device 120 one or more potential flight paths. An operator of the UAV 105 and/or user device 120 may select and/or confirm the flight path to be utilized.

During flight of the UAV 105, the UAV 105 may autonomously make adjustments to the flight path 140. The adjustments may be based on onboard sensors (e.g., for sensing obstacles, weather, etc.) and/or based on geographic information received from one or more of the base stations 125A-C (e.g., obstacle, weather, traffic emergency information). In an aspect, the UAV 105 may be operated to maintain a minimum distance separation between the UAV 105 and other UAVs, and/or between the UAV 105 and obstacles, e.g. such as minimum distance separation requirements or recommendations from the Federal Aviation Administration (FAA). In some cases, a flight path of the UAV 105 may have a fixed altitude level (e.g., the UAV 105 has to fly somewhere between a fixed minimum altitude level and a fixed maximum altitude level) and/or an operating frequency of the UAV 105 may be within a fixed frequency band (e.g., fixed frequency range). Such parameters on the flight path of the UAV 105 may be set by the user device 120, network management system 135, and/or flight regulations.

Although in one or more embodiments the UAV 105 may autonomously perform various actions, such as configuring the directional antenna 115 based on position information, in some cases the UAV 105 may be remotely controlled. In some cases, manual adjustment of the UAV 105 may be employed, such as for safety issues (e.g., preventing an accident or collision). Within the line of sight, the user device 120 may manually adjust the flight path 140 by communicating directly with the UAV 105. Beyond the line of sight, in an embodiment, the user device 120 may transmit control commands to the UAV 105 via one or more of the base stations 125A-C and/or the network management system 135. In some cases, the base stations 125A-C, network management system 135, and/or other devices (e.g., associated with the mobile network operator) may control the UAV 105. For example, the network management system 135 may have knowledge of one or more identifiers associated with the UAV 105 (e.g., for identifying the UAV 105 in the cellular network), and/or the UAV 105 may allow devices with knowledge of the identifier(s) to control the UAV 105. An operator (e.g., a person) may be able to directly see the UAV 105 (e.g., both within and beyond the line of sight provided by the user device 120) and/or may be able to monitor the UAV 105 and/or its surrounding (e.g., using cameras of the UAV 105). In an aspect, at any point in the flight path 140, the user device 120, base stations 125A-C, and/or network management system 135 may cause adjustment of the flight path 140. In some cases, the UAV 105 may be set to request authorization, such as from the user device 120, base stations 125A-C, and/or network management system 135, to perform certain actions. The UAV 105 may perform the actions once authorization is received.

In an embodiment, the UAV 105 may receive information (e.g., geographic information) from non-network devices (also referred to as non-network nodes). In this regard, the base stations 125A-C and network management system 135 may be referred to as network devices or network nodes of the cellular network. In some cases, a non-network device may provide one-way communication from the non-network device to the UAV 105. A non-network device may be placed at locations at or near an obstacle for example, and broadcast (e.g., using its antenna(s)) its position information and/or other geographic information to help prevent collision of the UAV 105 and/or other UEs/UAVs with the obstacle. As an example, the non-network device may be placed at or near a tall tree. As another example, the non-network device may be placed at a location designated as a no-fly zone and utilized as a no-fly zone beacon. For instance, a traffic accident (e.g., whether between two cars at ground level, two UAVs, a car and a building, and so forth) may cause emergency helicopters and/or other aircrafts to deployed in and/or around the no-fly zone. The UAV 105 may impede emergency response if flown in or around the no-fly zone.

Although FIG. 1 is described with respect to the UAV 105, the UE may generally be any device, e.g. at ground level or at higher altitudes, that can connect to a network device (e.g., base station of a cellular network) using an omnidirectional antenna 110 and/or a directional antenna 115. Although the UAV 105 is depicted as including a single omnidirectional antenna and a single directional antenna, in some cases the UAV 105 may have more, fewer, and/or different antennas than those shown in FIG. 1. For example, in an aspect, the UAV 105 does not include any omnidirectional antennas, and/or the UAV 105 includes multiple directional antennas. In addition, FIG. 1 illustrates one example of a network configuration. Other network configurations may be utilized to allow communication between the UAV 105, user device 120, base stations 125A-C, and the network management system 135. The network environment 100 may include a different number of UAVs, user devices, base stations, and/or network management systems than that shown in FIG. 1.

Figure 2:
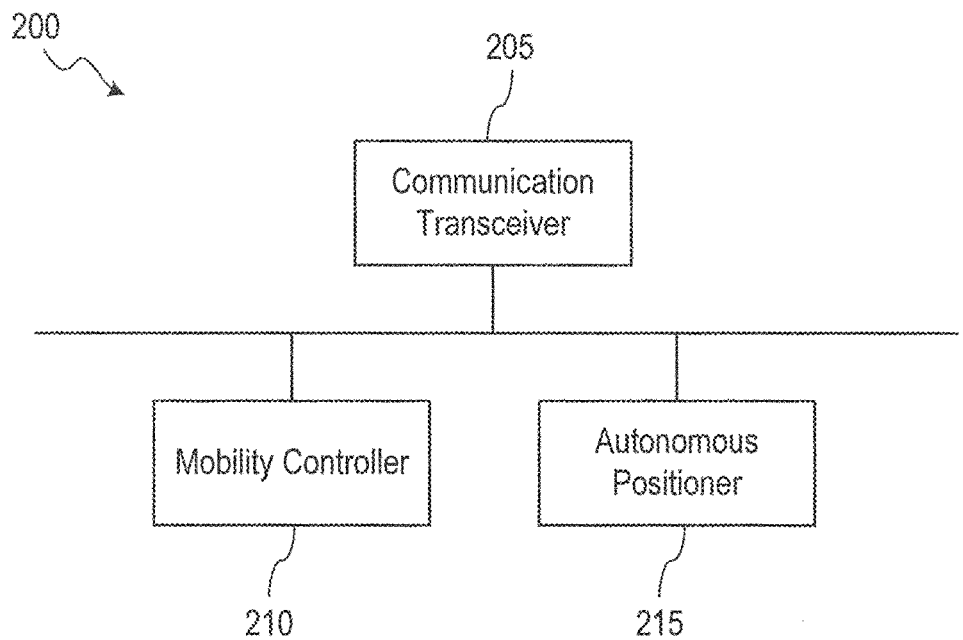
FIG. 2 illustrates a block diagram of an example of a UAV processing unit in accordance with one or more embodiments of the present disclosure.

FIG. 2 illustrates a block diagram of an example of a UAV processing unit 200 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. For explanatory purposes, the UAV processing unit 200 is described herein with reference to the example network environment 100 of FIG. 1; however, the UAV processing unit 200 is not limited to the example network environment 100 of FIG. 1. In an aspect, the UAV 105 includes the UAV processing unit 200.

The UAV processing unit 200 may include a communication transceiver 205, a mobility controller 210, and an autonomous positioner 215. The communication transceiver 205 may implement appropriate physical layer(s) and protocol stack(s) to enable communication between the UAV 105 and the user device 120, base stations 125A-C, and/or network management system 135. For example, the communication transceiver 205 may include an LTE transceiver module for implementing an LTE physical layer and LTE protocol stack, and/or any other 3G, 4G, and/or 5G transceiver module(s), and/or satellite network transceiver module(s), and/or other transceiver module(s) associated with other wireless protocols/applications. The communication transceiver 205 may allow the UAV 105 to transmit messages to and/or receive messages from the user device 120, base stations 125A-C, and/or network management system 135 via the omnidirectional antenna 110 and/or directional antenna 115.

The mobility controller 210 may implement any control and feedback operations appropriate for interacting with the avionics, control actuators, and/or other equipment included in the flight control unit to fly the UAV 105, including, but not limited to, taking off, landing, and/or setting/adjusting direction, velocity, and/or acceleration of the UAV 105. In some cases, the mobility controller 210 may receive commands from the user device 120, base stations 125A-C, and/or network management system 135, to, for example, configure a flight plan (e.g., program a flight path), adjust a programmed flight path, deploy the UAV 105, land the UAV 105, navigate the UAV 105, and/or other commands that facilitate navigating the UAV 105 and utilizing the UAV 105 to perform an action. In some cases, the mobility controller 210 may receive commands to move and/or rotate the UAV 105 and/or component thereof (e.g., the directional antenna 115).

The autonomous positioner 215 may be utilized to monitor (e.g., autonomously monitor) a current position of the UAV 105. The autonomous positioner 215 may include, or may be in communication with (e.g., via the communication transceiver 205), a GPS that provides the position of the UAV 105. In some cases, the autonomous positioner 215 may implement location determination techniques. In an aspect, the autonomous positioner 215 may determine a positional difference between the UAV 105 and a base station (e.g., the base station 125A) based on the position information of the UAV 105 and the base station. For example, the autonomous positioner 215 may generate signals (e.g., for the mobility controller) that cause rotation and/or movement of the directional antenna 115.

While an example manner of implementing the UAV processing circuit 200 is illustrated in FIG. 2, one or more of the components (e.g., elements, processes, and/or devices) illustrated in FIG. 2 may be combined, divided, re-arranged, omitted, eliminated, and/or implemented in any other way. Further, the communication transceiver 205, mobility controller 210, autonomous positioner 215, and/or, more generally, the UAV processing unit 200 of FIG. 2 may be implemented by hardware, software, firmware, and/or any combination of hardware, software, and/or firmware. Thus, for example, any of the communication transceiver 205, mobility controller 210, autonomous positioner 215, and/or, more generally, the UAV processing unit 200 may be implemented by one or more analog and/or digital circuits, logic circuits, programmable processors, application specific integrated circuits (ASICs), programmable logic devices (PLDs), and/or field programmable logic devices (FPLDs). In this regard, when implemented using circuitry, the UAV processing unit 205, communication transceiver 205, mobility controller 210, and autonomous positioner 215 may be referred to as UAV processing circuit, communication transceiver circuit, mobility controller circuit, and autonomous positioner circuit, respectively. When reading any claims as set forth herein to cover purely software and/or firmware implementations, at least one of the UAV processing unit 200, communication transceiver 205, mobility controller 210, and/or autonomous positioner 215 is hereby expressly defined to include a tangible computer readable storage device or storage disk such as a memory, digital versatile disk (DVD), compact disk (CD), a Blu-ray disc™, and/or other storage device/disk storing the software and/or firmware.

Figure 3:
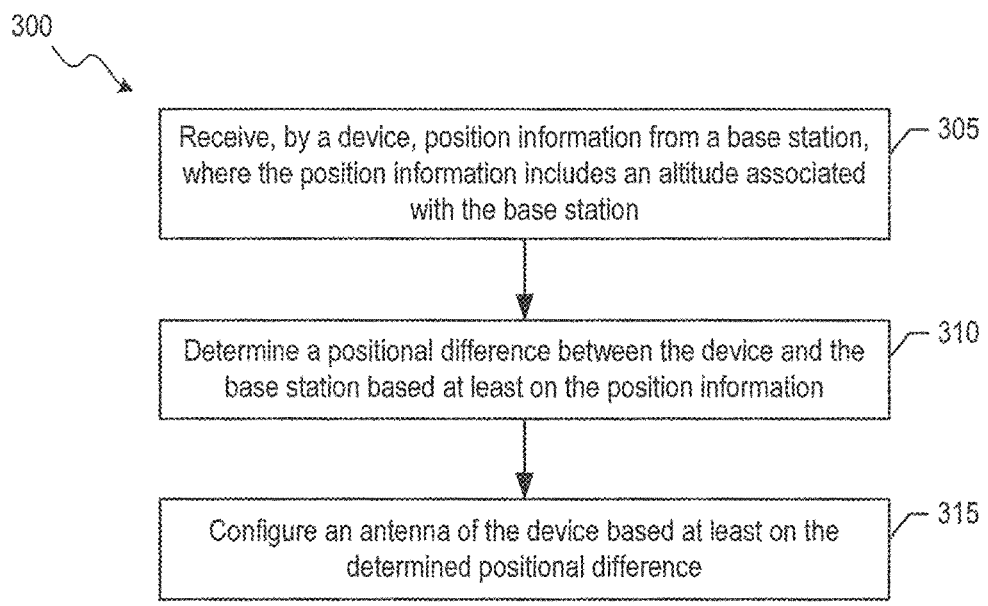
FIG. 3 illustrates a flow diagram of an example process for facilitating maintaining of antenna connectivity based on communicated geographic information in accordance with one or more embodiments of the present disclosure.

FIG. 3 illustrates a flow diagram of an example process 300 for facilitating maintaining of antenna connectivity based on communicated geographic information in accordance with one or more embodiments of the present disclosure. For explanatory purposes, the example process 300 is described herein with reference to the UAV 105 and the base station 125A of the example network environment 100 of FIG. 1; however, the example process 300 is not limited to the UAV 105 and the base station 125A of the example network environment 100 of FIG. 1. For example, the example process 300 may be with reference to the UAV 105 and one of the base stations 125B or 125C, and/or may be with reference to one or more UEs (e.g., UAVs, devices at ground or at higher altitudes, etc.) and/or one or more base stations not shown in FIG. 1. Note that one or more operations may be combined, omitted, and/or performed in a different order as desired.

At block 305, the UAV 105 receives position information from the base station 125A. The position information may include information indicative of a position associated with the base station 125A in three-dimensions. For example, the position information may include a latitude coordinate, a longitude coordinate, and an altitude coordinate of the base station 125A. In some cases, the position information may be the position of an antenna of the base station 125A utilized to transmit (e.g., broadcast) the position information. The altitude coordinate may be a distance (e.g., height) from a reference sea level. In some cases, rather than the longitude, latitude, and/or altitude coordinates, other coordinate systems by which to define the position of the base station 125A (or component thereof) may be utilized. The position information may include or may indicate an orientation (e.g., a tilt) associated with the antenna of the base station 125A.

In some embodiments, the position information may be provided as part of a broadcast message by the base station 125A and received by the UAV 105 (and other UAVs within range of the base station 125A). By way of non-limiting example, the broadcast message may be an MIB message, SIB message, MBMS-based message, eMBMS-based message, or generally any broadcast message that can be utilized to contain the position information.

As an example, the position information may be included in an MIB message or an SIB message. The SIB message may be one of many different, types. In an aspect of LTE, a system frame number (SFN) may be a value between 0 and 1023, inclusive, with the value 1023 going back to the value 0 when incremented. The SFN may be utilized as a timing reference by devices (e.g., the UAV 105) that receive broadcast messages from the base station 125A. A broadcast message associated with an SFN of n may be denoted as having an SFN n. A time between transmission of messages associated with any two adjacent SFNs (e.g., a time between SFN1 and SFN2, a time between SFN 894 and SFN 895) may be fixed at 10 ms. The MIB message and the different types of SIB messages may be generated and/or transmitted (e.g., broadcasted) at different times (e.g., represented in terms of SFN) and/or with different periodicity. An example of a timeline associated with transmission of MIB messages and SIB type1 messages is described with respect to FIGS. 4 and 5, respectively.

Figure 4:
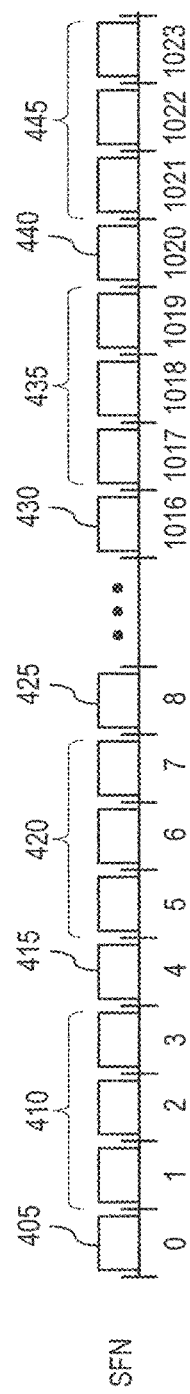
FIG. 4 illustrates an example of a timeline associated with transmission of master information block messages.

An MIB message includes information needed for the UAV 105 to acquire other information from the base station 125A. The MIB message may include carrier bandwidth and a current SFN. In an aspect, the MIB message may be utilized to include the position information of the base station 125A. A new MIB message is generated and transmitted every four SFNs (e.g., every 40 ms), starting at SFN 0. With reference to FIG. 4, a new MIB message (e.g., 405, 415, 425, 430, 440) is transmitted by the base station 125A at SFN 0, SFN 4, SFN 8 . . . SFN 1016, SFN 1020, with the ellipses representing intervening SFNs. In this regard, the periodicity of the new MIB message is 4. Between two new MIB messages, the earlier of the two new MIB messages is copied and transmitted by the base station 125A. For example, MIB messages 410 are the same as the MIB message 405, MIB messages 420 are the same as the MIB message 415, MIB messages 435 are the same as the MIB message 430, and MIB messages 445 are the same as the MIB message 440.

Figure 5:
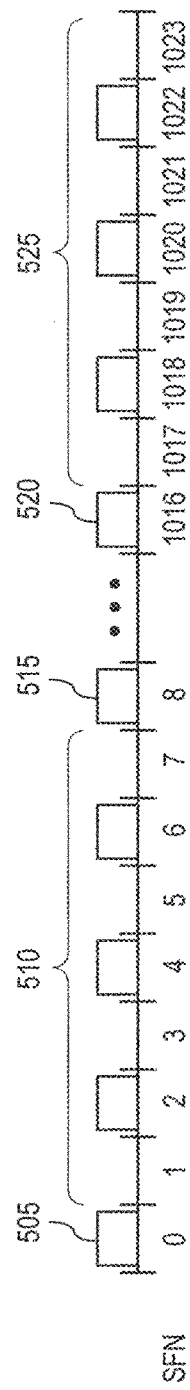
FIG. 5 illustrates an example of a timeline associated with transmission of system information block type 1 messages.

An SIB type 1 message, generally denoted as SIB1 message or SIB-1 message, may include information (e.g., access parameters) the UAV 105 needs to determine whether the UAV 105 is allowed access to the base station 125A, and also may include information regarding the scheduling of system information blocks of other types. In this regard, the SIB1 message provides information indicative of which types of SIB messages are to be sent at which SFNs. A new SIB1 message is generated and transmitted every eight SFNs (e.g., every 80 ms), starting at SFN 0. With reference to FIG. 5, a new SIB1 message (e.g., 505, 515, 520) is transmitted at SFN 0, SFN 8 . . . SFN 1016, with the ellipses representing intervening SFNs. In this regard, the periodicity of the new MIB message is 8. Between two new SIB1 messages, the earlier of the two new SIB1 messages is copied and transmitted every other SFN (e.g., at SFN2, SFN4, and SFN6). For example, SIB1 messages 510 transmitted at SFN 2, 4, and 6 are the same as the SIB1 message 505 transmitted at SFN 0, and SIB1 messages 525 transmitted at SFN 1018, 1020, and 1022 are the same as the SIB1 message 520 transmitted at SFN 1016.

An SIB type 2 message, generally denoted as SIB2 message or SIB-2 message, may include configuration information common to all UEs accessing the base station 125A. The scheduling of the SIB2 message may be based on the information provided in an SIB1 message. Other types of SIB messages are provided in the 3GPP standard. In an embodiment, an MIB message, SIB1 message, and/or other type of SIB message may include the position information of the base station 125A. For example, the SIB message may be of a type that allocates (e.g., dedicates) at least a portion of its message size (e.g., in bits) to information utilized for facilitating communication of devices at higher altitudes (e.g., the UAV 105) with the cellular network via the base station 125A, such as the position information of the base station 125A.

In an aspect, the position information may be provided in a type of SIB message that contains information dedicated to facilitating connectivity for aerial vehicles and devices operating at higher altitudes. Devices or vehicles that may not benefit from the information in such a type of SIB message, such as devices or vehicles at or near ground level, may disregard or ignore (e.g., not listen for) the SIB message.

At block 310, the UAV 105 determines a positional difference between the UAV 105 and the base station 125A based on the position information from the base station 125A. The positional difference may be represented by one or more angles (e.g., relative to reference axes) and/or a vector pointing from the UAV 105 (e.g., or component thereof such as the directional antenna 115) to the base station 125A (e.g., or component thereof such as an antenna of the base station 125A). For example, the UAV 105 may determine the positional difference by determining (e.g., computing) a vector that points the directional antenna 115 at the antenna of the base station 125A. The vector can be computed using the position of the directional antenna 115 and the position of the antenna of the base station 125A (e.g., received at block 305). In an aspect, the UAV 105 may determine a position of the directional antenna 115 based on position information (e.g., 3D coordinates) from a GPS in the UAV 105 and/or otherwise in communication with the UAV 105, and/or based on other location determination techniques. For example, the GPS may provide the position of a certain component of the UAV 105, from which the UAV 105 may derive the position of the directional antenna 115.

In an embodiment, the positional difference may further be based on other geographic information, such as obstacle and/or emergency broadcast information. For example, the vector may deviate from a direct, straight path between the directional antenna 115 and the antenna of the base station 125A, such as to avoid an obstruction along the direct, straight path. In some cases, the other geographic information may be retrieved from a data channel (e.g., a streaming data channel) that contains such information. In this regard, the base station 125A may provide, to the UAV 105, a pointer to the data channel, and the UAV 105 may access the data channel (e.g., tune to the data channel) identified by the pointer to retrieve such information.

At block 315, the UAV 105 may configure an antenna of the UAV 105 based on the determined positional difference. In some cases, the UAV 105 may adjust the position and/or orientation (e.g., tilt) of the directional antenna 115 (e.g., through control effectuated by the mobility controller 210 of FIG. 2) based on the determined positional difference. In an aspect, the configuration of the directional antenna 115 may allow signals of higher signal strength to be transmitted to and received from the base station 125A, e.g. relative to a case in which the omnidirectional antenna 110 or the directional antenna 115 prior to configuration at block 315 is utilized. In some cases, to effectuate the tilt of the directional antenna 115, the entire UAV 105 may be flown at a particular angle and/or with a particular tilt (e.g., through control effectuated by the mobility controller 210 of FIG. 2).

In an aspect, configuring the antenna at block 315 may include switching from the omnidirectional antenna 110 to the directional antenna 115 and pointing the directional antenna 115 based on the positional difference. In another aspect, configuring the antenna at block 315 may include selecting one of multiple directional antennas available to (e.g., mounted on) the UAV 105 based on the positional difference and pointing the selected directional antenna. In some cases, the selected directional antenna may be the antenna that needs the least adjustment to point at the base station 125A. In some cases, one or more of the multiple directional antennas may be fixed (e.g., not adjustable). In such cases, the pointing of the antenna may be effectuated by rotating and/or tilting the entire UAV 105. In an aspect, configuring an antenna at block 315 may include adjusting a flight path (e.g., including adjusting flight altitude) of the UAV 105 and/or tuning an antenna to a different frequency band, alternative or in addition to, for example, adjusting the orientation (e.g., tilt) and/or position of an antenna, switching to another antenna, etc.

In an aspect, the UAV 105 may utilize the omnidirectional antenna 110 or the directional antenna 115 at block 305. For example, the UAV 105 may utilize the omnidirectional antenna 110 by default to facilitate locating of a base station with which to point the directional antenna 115. In some cases, the UAV 105 may switch from using the directional antenna 115 to using the omnidirectional antenna 110 based on received signal strength. For instance, the UAV 105 may switch from using the directional antenna 115 to using the omnidirectional antenna 110 when the directional antenna 115 is unable to receive signals with signal strength higher than a threshold value for over a threshold period of time. Such threshold value and threshold period of time may be set during setup of the UAV 105 for example.

In some cases, the UAV 105 may utilize the directional antenna 115 when the UAV 105 has a priori knowledge of the position of other base stations. For example, when or before the UAV 105 exits a coverage region of the base station 125A, the UAV 105 may utilize the neighbor list from the base station 125A to point the directional antenna 115 at a base station on the neighbor list. In some cases, the UAV 105 may utilize the omnidirectional antenna 110 to locate other base stations when the UAV 105 does not have a priori knowledge of the position of other base stations and a current direction pointed at by the directional antenna 115 is unable to receive signals of sufficient signal strength.

In an embodiment, the configuration of the directional antenna 115 and/or the flight path of the UAV 105 may be based on the position information of the base station 125A and/or other geographic information provided by the base station 125A. For example, the geographic information provided by the base station 125A may include the neighbor list of the base station 125A. The UAV 105 may transition the directional antenna 115 from pointing at the base station 125A to pointing at one of the base stations on the neighbor list of the base station 125A, such as when the UAV 105 is about to exit a coverage region of the base station 125A and/or about to enter a coverage region of a neighboring base station. The neighbor list may provide position information of neighboring base stations.

With continued reference to this example, in some cases, the UAV 105 may configure the directional antenna 115 to point at another base station even when the base station 125A is currently associated with better reception than the other base station. In one case, this may occur when signals between the base station 125A and the UAV 105 are about to be obstructed. The obstruction(s) may be an obstacle identified in the obstacle information and/or emergency broadcast information transmitted by the base station 125A and/or other base stations. For example, the obstruction(s) may be another UAV, a tall building, a no-fly zone, inclement local weather, and/or other obstructions. In this regard, the geographic information may provide an indication/prediction of a future (e.g., near future) reception associated with the base station 125A, and the UAV 105 may configure the directional antenna 115 based on such information.

Different parts of the geographic information may be sent at different times and/or with different periodicity. In an aspect, the different parts of the geographic information may be sent in different broadcast messages, e.g. in the MIB message or different types of SIB messages. For example, the position information and the emergency broadcast information may be sent more frequently than other information, such as in the MIB message and/or SIB1 message.

In some embodiments, the UAV 105 may receive signals from multiple base stations. In such embodiments, the UAV 105 may compare the signal strengths for the base stations and select the base station associated with the highest signal strength (e.g., best reception).

Figure 6:
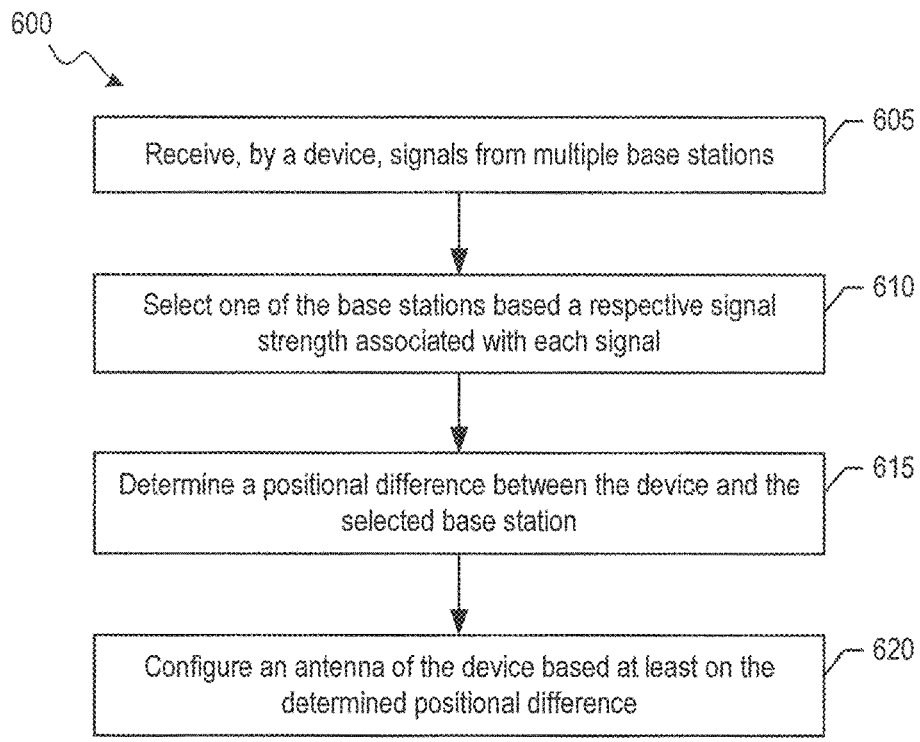
FIG. 6 illustrates a flow diagram of another example process for facilitating maintaining of antenna connectivity based on communicated geographic information in accordance with one or more embodiments of the present disclosure.

FIG. 6 illustrates a flow diagram of an example process 600 for facilitating maintaining of antenna connectivity based on communicated geographic information in accordance with one or more embodiments of the present disclosure. For explanatory purposes, the example process 600 is described herein with reference to the UAV 105 and the base stations 125A-C of the example network environment 100 of FIG. 1; however, the example process 600 is not limited to the UAV 105 and the base stations 125A-C of the example network environment 100 of FIG. 1. For example, the example process 600 may be with reference to the UAV 105 and one of the base stations 125B or 125C, and/or may be with reference to one or more UEs (e.g., UAVs, devices at ground or at higher altitudes, etc.) and/or one or more base stations not shown in FIG. 1. Note that one or more operations may be combined, omitted, and/or performed in a different order as desired.

At block 605, the UAV 105 receives signals from the base stations 125A-C. In an aspect, each signal may include an indication of the base station that transmitted the signal. At block 610, the UAV 105 selects one of the base stations 125A-C based on a respective signal strength associated with each received signal. In this regard, the UAV 105 may measure the signal strength associated with the received signals and select the base station that transmitted the signal received with the highest signal strength by the UAV 105. The UAV 105 may measure the signal strength by utilizing (e.g., computing) measures such as RSSI, RSRP, SNR, SINR, and/or other measures. In an aspect, the signals received from the base stations 125A-C may include, and/or may refer to, broadcast packets (e.g., broadcast messages) from the base stations 125A-C, and/or generally any packets received by the UAV 105 from the base stations 125A-C.

At block 615, the UAV 105 may determine a positional difference between the UAV 105 and the selected base station based on position information (e.g., altitude information) associated with the selected base station. In one example, the signal received from the selected base station at block 605 may include the position information (e.g., longitude, latitude, altitude) from which the UAV 105 may compute the positional difference. In another example, subsequent to the selection at block 610, the UAV 105 may scan for a signal (e.g., broadcast signal) from the selected base station that includes the position information of the selected base station. In another example, the UAV 105 may obtain the position information of the selected base station from a neighbor list received from another base station. The UAV 105 may determine the positional difference when the position information of the selected base station is received. At block 620, the UAV 105 configures an antenna of the UAV 105 based at least on the determined positional difference.

Figure 7:
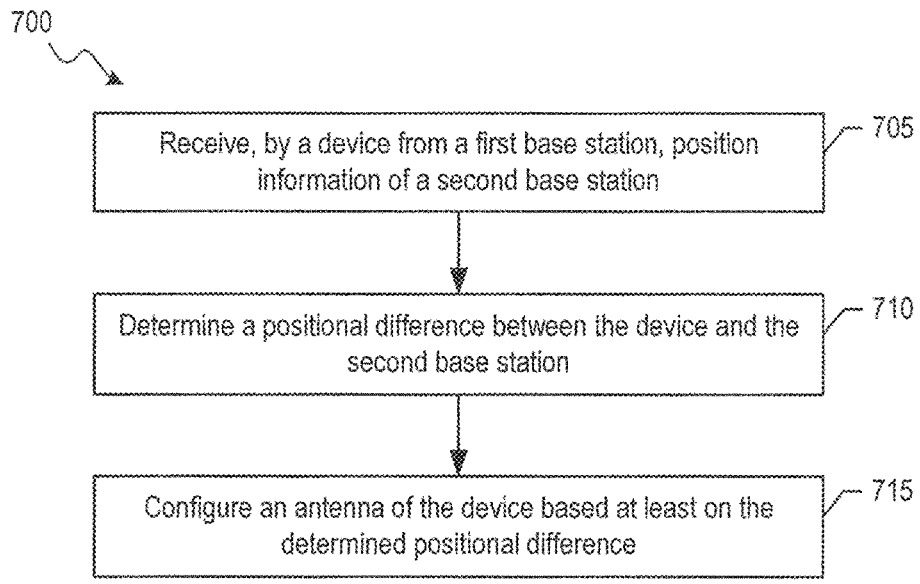
FIG. 7 illustrates a flow diagram of another example process for facilitating maintaining of antenna connectivity based on communicated geographic information in accordance with one or more embodiments of the present disclosure.

FIG. 7 illustrates a flow diagram of an example process 700 for facilitating maintaining of antenna connectivity based on communicated geographic information in accordance with one or more embodiments of the present disclosure. For explanatory purposes, the example process 700 is described herein with reference to the UAV 105 and the base stations 125A-C of the example network environment 100 of FIG. 1; however, the example process 700 is not limited to the UAV 105 and the base stations 125A-C of the example network environment 100 of FIG. 1. For example, the example process 700 may be with reference to the UAV 105 and one of the base stations 125B or 125C, and/or may be with reference to one or more UEs (e.g., UAVs, devices at ground or at higher altitudes, etc.) and/or one or more base stations not shown in FIG. 1. Note that one or more operations may be combined, omitted, and/or performed in a different order as desired.

At block 705, the UAV 105 receives position information of the base station 125B from the base station 125A. The position information may be included in a neighbor list of the base station 125A. At block 710, the UAV 105 determines a positional difference between the base station 125B and the UAV 105. At block 715, the UAV 105 configures the directional antenna 115 based on the determined positional difference.

In some aspects, at block 705, the UAV 105 may receive position information of multiple other base stations from the base station 125A. For example, the UAV 105 may receive position information of the base stations 125B and 125C from the base station 125A (e.g., on the neighbor list of the base station 125A). The UAV 105 may select one of the base stations 125A-C. The selection may be based on a respective distance between the UAV 105 and each of the base stations 125A-C. The UAV 105 may select the base station closer to the UAV 105. Alternatively or in addition, the selection may be based on signal strengths of each of the base stations 125A-C. For example, when the UAV 105 is pointed at the base station 125A, the UAV 105 may measure the signal strength of signals received from the base station 125A, such as the signal strength of a message that includes the position information received at block 705. The UAV 105 may then point the directional antenna 115 at the base station 125B and measure the signal strength of signals received from the base station 125B, and point the directional antenna 115 at the base station 125C and measure the signal strength of signals received from the base station 125C. The UAV 105 may select the base station associated with highest signal strength and/or based on other geographic information (e.g., obstacle information, emergency broadcast information, etc.), and configure the directional antenna 115 based on the selected base station.

Figure 8:
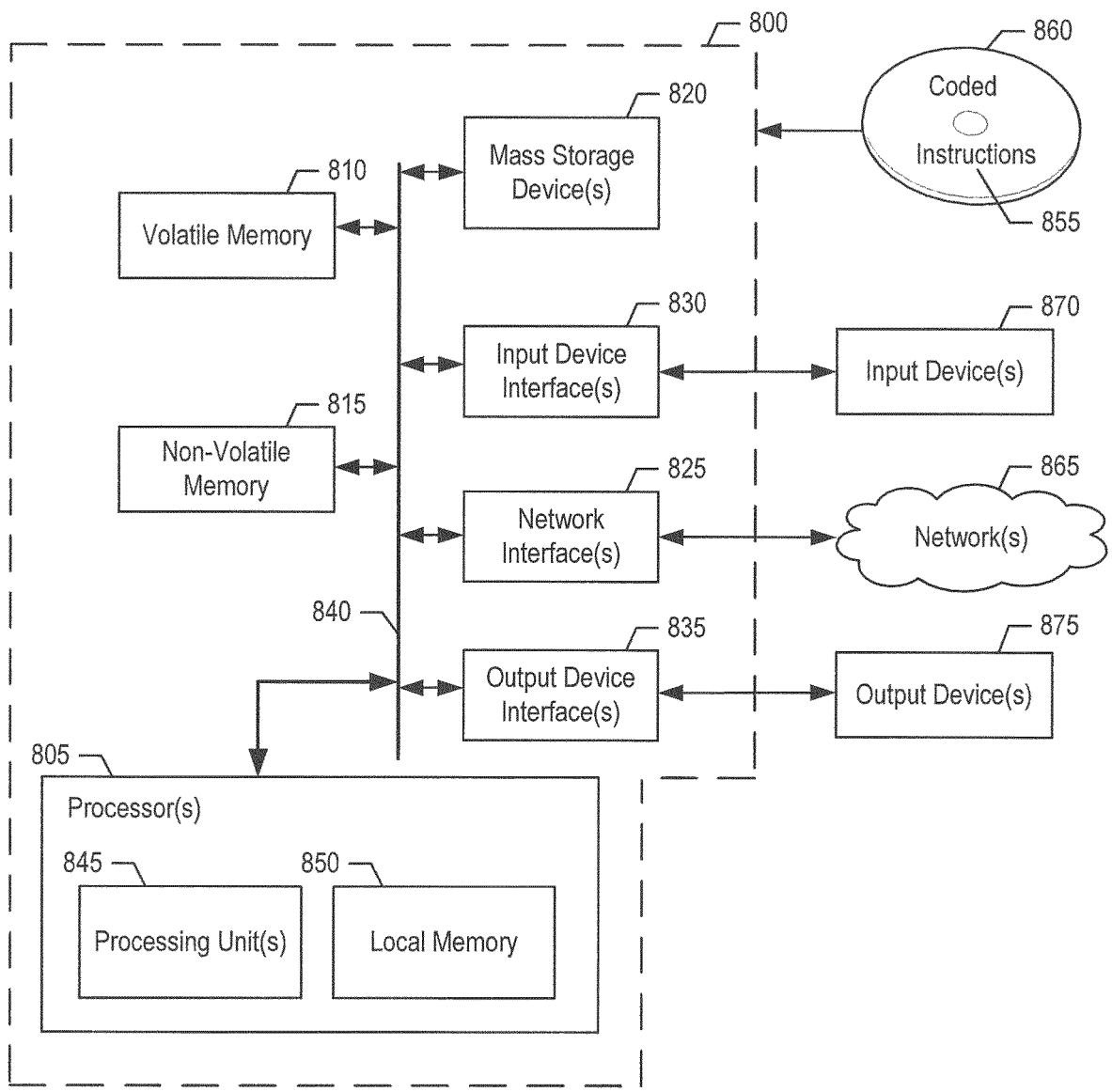
FIG. 8 illustrates a block diagram of an example of an electronic system with which one or more embodiments of the present disclosure may be implemented.

FIG. 8 illustrates a block diagram of an example of an electronic system 800 with which one or more embodiments of the present disclosure may be implemented. In an embodiment, the electronic system 800 may be, may include, or may be referred to as, processor platform. The electronic system 800 can generally be any type of computing device. In an embodiment, the electronic system 800 can be, can include, and/or can be a part of, one or more of the UAV 105, user device 120, base stations 125A-C, network management system 135, shown in FIG. 1. For example, the electronic system 800 may be, may include, or may be a part of, the UAV 105.

The electronic system 800 includes one or more processors 805, volatile memory 810, non-volatile memory 815, one or more mass storage devices 820, one or more network interfaces 825, one or more input device interfaces 830, one or more output device interfaces 835, and a link 840. The link 840 may be, may include, or may be implemented by, a bus, one or more point-to-point connections (e.g., intra-chip connections and/or inter-chip connections), and/or other connections for facilitating connection of and/or communication between various components of the electronic system 800.

The link 840 couples (e.g., connects) to the processor(s) 805. In an aspect, the processor(s) 805 of the illustrated example is hardware. For example, the processor(s) 805 can be implemented by one or more integrated circuits, logic circuits, processors, and/or controllers from any desired family or manufacturer. The processor(s) 805 includes one or more processing units 845 configured via instructions 855 stored in a local memory 850 (e.g., a cache) of the processor(s) 805. In an aspect, for a UAV (e.g., the UAV 105), the instructions 855 may include instructions that when executed, perform the instructions of FIGS. 3, 6, and 7, to implement the UAV processing unit 200, mobility controller 210, and/or autonomous positioner 215 of FIG. 2. The processor(s) 805 is in communication with the volatile memory 810, non-volatile memory 815, and the mass storage device(s) 820 via the link 840. In an aspect, the processor(s) 805 may be, may include, or may be a part of, the UAV processing unit 200 of FIG. 2. In an aspect, the processor unit(s) 845 may be, may include, or may be a part of, the UAV processing unit 200 of FIG. 2.

The link 840 couples (e.g., connects) to the volatile memory 810, non-volatile memory 815, and mass storage device(s) 820. The volatile memory 810 may include synchronous dynamic random access memory (SDRAM), dynamic RAM (DRAM), static RAM (SRAM) Rambus dynamic RAM (RDRAM), and/or other types of volatile memory. The non-volatile memory 815 may include read-only memory (ROM), programmable ROM (PROM), erasable programmable ROM (EPROM), electrically erasable programmable (EEPROM), flash memory, non-volatile RAM (NVRAM), and/or other types of non-volatile memory. The non-volatile memory 815 may store instructions and data even when the electronic system 800 is off. The mass storage device(s) 820 may include floppy disk drives, hard disk drives, compact disk drives, DVD drives, Blu-ray disc™ drives, redundant array of independent disks (RAID) systems, solid state memories, and/or other devices that allow storage. Access to the volatile memory 810, non-volatile memory 815, and mass storage device(s) 820 may be controlled by a memory controller (not shown). In an aspect, the coded instructions 855 corresponding to the instructions of FIGS. 3, 6, and/or 7 may be stored in the volatile memory 810, non-volatile memory 815, mass storage device(s) 820, local memory 850, and/or on a removable tangible computer readable storage medium, such as a disk 860 (e.g., CD, DVD, or Blu-ray disc™).

The link 840 couples (e.g., connects) to the network interface(s) 825. The network interface(s) 825 may couple the electronic system 800 to one or more networks 865. In this manner, the electronic system 800 can be a part of a network of devices, such as a local area network (LAN), a WAN, or an Intranet, or a network of networks, such as the Internet. In an embodiment, the network interface(s) 825 may facilitate communication between the electronic system 800 and a cellular network, such as a cellular network that includes the base stations 125A-C and network management system 135 of FIG. 1. In this regard, the network interface(s) 825 may also facilitate communication between the electronic system 800 and the user device 120. The network interface(s) 825 may be implemented by any type of interface standard, such as an Ethernet interface, a universal serial bus (USB) interface, a PCI express interface, a wireless network interface (e.g., wireless LAN interface), a cellular network interface, and/or other interfaces. For example, a cellular network interface may provide support for Global System for Mobile Communications (GSM)-based cellular networks, code division multiple access (CDMA)-based cellular networks, and/or other cellular networks. The network interface(s) 825 may include a communication device such as a transmitter, receiver, transceiver, modem, and/or network interface card to facilitate exchange of data with external machines (e.g., computing devices of any kind) via the network(s) 865. In an aspect, the network interface(s) 825 may be structured to implement the communication transceiver 205 of FIG. 2.

The link 840 couples (e.g., connects) to the input device interface(s) 830. The input device interface(s) 830 may couple the electronic system 800 to one or more input devices 870. The input device(s) 870 may enable a user to provide (e.g., enter) data and commands to the electronic system 800. For example, the user may be an operator of the UAV 105 when the electronic system 800 is disposed on the UAV 105 or when the electronic system 800 is a remote control device (e.g., the user device 120) of the UAV 105. The input device(s) 870 may include, for example, an audio sensor, a microphone, a camera (still or video), a voice recognition system, a keyboard (e.g., a physical or virtual keyboard), a cursor control device (e.g., a mouse), a touchscreen, and/or other devices for providing user input to the electronic system 800. Also, many systems, such as the electronic system 800, can allow a user to provide data and commands using physical gestures, such as, but not limited to, hand or body movements, facial expressions, and face recognition. In this regard, the user input may be received in any form, such as audio (e.g., speech), visual, and/or tactile. For example, in an aspect, to adjust a flight path of a UAV (e.g., the UAV 105) that is, includes, or is a part of the electronic system 800, the user may enter text via a physical keyboard communicatively connected to the electronic system 800 via the input device interface(s) 830. The text input may be relayed to the processor(s) 805 via the input device interface(s) 830 and the link 840. The processor(s) 805 may process the text input into commands to adjust the flight path of the UAV and facilitate implementation of the commands.

The link 840 couples (e.g., connects) to the output device interface(s) 835. The output device interface(s) 835 may couple the electronic system 800 to one or more output devices 875. The output device interface(s) 835 may include a graphics and/or audio driver card, graphics and/or audio driver chip, and/or graphics and/or audio driver processor. The output device(s) 875 may enable the electronic system 800 to provide output information to a user. The output device(s) 875 may include, for example, display devices (e.g., a light emitting diode (LED), an organic LED (OLED), a liquid crystal display (LCD)), audio devices (e.g., speakers), audiovisual devices, and/or other output devices. In this regard, the output information may provide feedback to the user in any form, such as visual feedback, auditory feedback, and/or tactile feedback. For example, in an aspect, a UAV (e.g., the UAV 105) that is, includes, or is a part of the electronic system 800 may provide operational characteristics, such as remaining battery power, remaining fuel level, remaining actions to be performed, current position in a flight path, component health (e.g., engine health, battery health), to a display coupled to the UAV (e.g., wired or wirelessly coupled) via the output device interface(s) 835 and viewable by the user.

In one or more embodiments, FIGS. 3, 6, and 7 illustrate example machine readable instructions for implementing the UAV 105, UAV processing unit 200, communication transceiver 205, mobility controller 210, and/or autonomous positioner 215. In these examples, the machine readable instructions may include one or more programs for execution by one or more processors, such as the processor(s) 805 shown in the electronic system 800. The one or more programs, or portion(s) thereof, may be embodied in software stored on a tangible computer readable storage medium, such as a CD-ROM, a floppy disk, a hard drive, a DVD, a Blu-ray disc™, and/or a memory associated with the processor(s) 805, but the entire program or programs and/or portions thereof may alternatively be executed by a device other than the processor(s) 805, and/or embodied in firmware or dedicated hardware (e.g., implemented by an ASIC, a PLD, an FPLD, discrete logic, etc.). Further, although the example program(s) is described with reference to the flow diagrams illustrated in FIGS. 3, 6, and 7, many other methods may be used. For example, with reference to the flow diagrams illustrated in FIGS. 3, 6, and 7, the order of execution of the blocks may be changed, and/or some of the blocks described may be changed, removed, combined, and/or subdivided into multiple blocks.

The example processes 300, 600, and 700 of FIGS. 3, 6, and 7, respectively, may be implemented using coded instructions (e.g., computer and/or machine readable instructions) stored on a tangible computer readable storage medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). Alternatively or in addition, the example processes 300, 600, and 700 of FIGS. 3, 6, and 7, respectively, may be implemented using coded instructions (e.g., computer and/or machine readable instructions) stored on a non-transitory computer and/or machine readable medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). As used herein, the terms "tangible computer readable storage medium" and "non-transitory computer readable medium" are expressly defined to include any type of computer readable storage device and/or storage disk and to exclude propagating signals and to exclude transmission media. As used herein, "tangible computer readable storage medium" and "tangible machine readable storage medium" are used interchangeably.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of the present disclosure is not limited to such standards and protocols. For instance, each of the standards for Internet and other packet switched network transmission (e.g., Transmission Control Protocol (TCP)/Internet Protocol (IP), User Datagram Protocol (UDP)/IP, Hypertext Markup Language (HTML), Hypertext Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by the present disclosure and are intended to be included within the scope of the accompanying claims.

Additionally, although embodiments of the present disclosure provide example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the foregoing provides example systems, methods, and articles of manufacture, the examples are not the only way to implement such systems, methods, and articles of manufacture. Therefore, although certain example methods, apparatus, and articles of manufacture have been described herein, the scope of coverage of the present disclosure is not limited thereto. On the contrary, the present disclosure covers all methods, apparatus, and articles of manufacture fairly falling within the scope of the claims either literally or under the doctrine of equivalents.

What is claimed is:

1. A device, comprising:
   an antenna;
   one or more processors; and
   a non-transitory machine readable medium comprising instructions stored therein, which when executed by the one or more processors, cause the one or more processors to perform operations, the operations comprising:
   receiving, from a first cellular base station, first geographic information associated with the first cellular base station as part of one or more broadcast messages, wherein the one or more broadcast messages are receivable by user equipment within a receiving range of the first cellular base station, wherein a first portion of the first geographic information comprises position information and is received in a first type of broadcast message associated with a first periodicity, and wherein a second portion of the first geographic information is received in a second type of broadcast message associated with a second periodicity different from the first periodicity;
   determining a first direction to point the antenna based on the first geographic information; and
   configuring the antenna based on the first direction.

2. The device of claim 1, wherein the position information is indicative of an altitude associated with the first cellular base station, and wherein the first direction is based at least on the position information.

3. The device of claim 1, wherein the first geographic information comprises obstacle information and/or weather information, and wherein the first direction is based at least on the obstacle information and/or the weather information.

4. The device of claim 1, wherein the operations further comprise receiving, from the first cellular base station, signal strength information indicative of signal strength statistics based on signals previously received by user equipment from the first cellular base station at different altitude levels and/or in different frequency bands, wherein the different altitude levels are relative to a reference level, and wherein the configuring is further based on the signal strength information.

5. The device of claim 1, wherein the operations further comprise:
   receiving, from the first cellular base station, second geographic information associated with a second cellular base station;
   determining a second direction to point the antenna based at least on the second geographic information; and
   configuring the antenna based at least on the second direction.

6. The device of claim 1, wherein the operations further comprise:
   receiving signals from each of a plurality of cellular base stations that includes the first cellular base station;
   selecting one of the plurality of cellular base stations based at least on a signal strength associated with the received signals;
   determining a second direction to point the antenna based at least on position information associated with the selected one of the plurality of cellular base stations; and
   configuring the antenna to point at the selected one of the plurality of cellular base stations based at least on the second direction.

7. The device of claim 1, wherein at least one of the one or more broadcast messages is a master information block (MIB) message or a system information block (SIB) message, wherein at least one of the one or more broadcast messages is encrypted, and wherein the device comprises an unmanned vehicle.

8. A method to facilitate network connectivity for a device, the method comprising:
   receiving, by the device, position information associated with a first base station, wherein the position information comprises information indicative of an altitude associated with the first base station;
   receiving, by the device from the first base station, signal strength information indicative of signal strength statistics based on signals previously received by user equipment from the first base station at different altitude levels and/or in different frequency bands, wherein the different altitude levels are relative to a reference level;
   determining, by the device, a direction to point an antenna of the device based at least on the position information; and
   configuring, by the device, the antenna based at least on the direction and the signal strength information.

9. The method of claim 8, further comprising determining, by the device, a positional difference between the device and the first base station based at least on the position information, wherein the direction is based on the positional difference.

10. The method of claim 8, further comprising:
    receiving, by the device, an indication of a data channel;
    accessing, by the device, the data channel based on the indication; and
    retrieving, by the device, geographic information from the data channel,
    wherein the direction is based on the position information and the geographic information.

11. The method of claim 10, wherein the position information associated with the first base station and the indication are received as part of one or more broadcast messages from a second base station, and wherein the one or more broadcast messages are receivable by user equipment within a receiving range of the second base station.

12. The method of claim 11, wherein the second base station comprises an eNodeB.

13. The method of claim 8, wherein the configuring comprises:
    selecting the antenna from among a plurality of antennas of the device; and/or
    adjusting an orientation of the antenna based on the direction.

14. The method of claim 8, further comprising receiving obstacle information associated with the first base station and/or weather information associated with the first base station, wherein the direction is further based on the obstacle information and/or the weather information.

15. The method of claim 14, wherein:
    the position information is received in a first type of message associated with a first periodicity, and
    the obstacle information and/or the weather information is received in a second type of message associated with a second periodicity different from the first periodicity.

16. A non-transitory machine readable storage medium including machine readable instructions which, when executed, cause one or more processors of a device to perform operations, wherein the operations comprise:
    receiving geographic information associated with a base station as part of one or more broadcast messages, wherein the one or more broadcast messages are receivable by user equipment within a receiving range of the base station, wherein a first portion of the geographic information comprises position information and is received in a first type of broadcast message associated with a first periodicity, and wherein a second portion of the geographic information is received in a second type of broadcast message associated with a second periodicity different from the first periodicity;
    determining a direction to point an antenna based on the geographic information; and
    configuring the antenna based on the direction.

17. The non-transitory machine readable storage medium of claim 16, wherein the position information is indicative of an altitude associated with the base station, and wherein the direction is based at least on the position information.

* * * * *